(12) United States Patent
Lau

(10) Patent No.: US 8,140,883 B1
(45) Date of Patent: Mar. 20, 2012

(54) SCHEDULING OF PIPELINED LOOP OPERATIONS

(75) Inventor: David James Lau, Scotts Valley, CA (US)

(73) Assignee: Altera Corporation, San Jose, CA (US)

( * ) Notice: Subject to any disclaimer, the term of this patent is extended or adjusted under 35 U.S.C. 154(b) by 891 days.

(21) Appl. No.: 12/113,899

(22) Filed: May 1, 2008

Related U.S. Application Data

(60) Provisional application No. 60/915,892, filed on May 3, 2007.

(51) Int. Cl.
  *G06F 1/14* (2006.01)
  *G06F 17/50* (2006.01)
  *G06F 9/45* (2006.01)
  *H03K 19/173* (2006.01)

(52) U.S. Cl. ............. 713/502; 326/38; 716/18; 717/149

(58) Field of Classification Search .................. 713/502; 716/18; 326/38; 717/149
  See application file for complete search history.

(56) References Cited

U.S. PATENT DOCUMENTS

| | | | | |
|---|---|---|---|---|
| 5,802,360 A | * | 9/1998 | Fernando | 712/229 |
| 5,826,236 A | * | 10/1998 | Narimatsu et al. | 705/8 |
| 6,691,240 B1 | * | 2/2004 | Stotzer et al. | 713/400 |
| 7,379,888 B1 | * | 5/2008 | Mahapatro | 705/8 |
| RE40,925 E | * | 9/2009 | Ly et al. | 716/103 |
| 7,844,944 B2 | * | 11/2010 | Gutberlet et al. | 717/105 |
| 2007/0113231 A1 | * | 5/2007 | Honmura | 718/100 |
| 2009/0219051 A1 | * | 9/2009 | Zhang et al. | 326/38 |

OTHER PUBLICATIONS

Smita Bakshi et al , Performance-Constrained Hierarchical Pipeling for Behaviors, Loops, and Operations, ACM Transactions on Design Automation of Electronic Systems, vol. 6, No. 1, Jan. 2001, pp. 1-25.*
Fermin Sanchez, Loop Pipelining with resource and timing constraints, Oct. 1995, Universitat Politècnica De Catalunya.*
Mentor Graphics, "Catapult Synthesis," www.mentor.com/c-based_design, 4 pages.
Yoo, Heejin, et al., "A Scheduling Algorithm for Pipelined Data Path Synthesis with Grandual Mobility Reduction," Dept. of Computer Science, Hongik University, Korea, 4 pages.
Lecture 9 Notes, Gac1, Jan. 31, 2006, Located at http://cas.ee.ic.ac.uk/people/gac1/Synthesis/Lecture9.pdf.

* cited by examiner

*Primary Examiner* — Paul R Myers
*Assistant Examiner* — Christopher A Daley
(74) *Attorney, Agent, or Firm* — Weaver Austin Villeneuve & Sampson LLP

(57) ABSTRACT

Pipelined loop operations are efficiently scheduled. A preliminary as soon as possible (ASAP) schedule for a data operation in a pipelined loop is determined. A producer operation clock cycle associated with a producer operation in the pipelined loop is determined. The producer operation provides a data value for use by the data operation in a subsequent loop. A consumer operation clock cycle associated with a consumer operation in the pipelined loop is determined. The consumer operation obtains the data value from the data operation in a previous loop. The data operation is scheduled at the half-way point between the producer operation clock cycle and the consumer operation clock cycle.

22 Claims, 7 Drawing Sheets

SCHEDULING OF PIPELINED LOOP OPERATIONS

CROSS REFERENCE TO RELATED APPLICATIONS

This application claims benefit of priority under 35 U.S.C. 119(e) of (i) U.S. Provisional Application No. 60/915,892 filed May 3, 2007 and titled "SCHEDULING OF PIPELINED LOOP OPERATIONS", the entirety of which is incorporated by reference for all purposes.

TECHNICAL FIELD

The present disclosure relates to scheduling of pipelined loop operations with data dependencies.

DESCRIPTION OF RELATED ART

As Soon As Possible (ASAP), As Late As Possible (ALAP), and List Scheduling are commonly used scheduling algorithms in behavioral synthesis. However, these scheduling algorithms have limitations, particularly when applied to pipelined data paths. In many instances, these scheduling algorithms can generate sub-optimal or even worst case results.

Conventional compiler techniques and mechanisms that have been applied to behavioral synthesis have limitations. Consequently, it is desirable to provide improved techniques and mechanisms for scheduling operations such as pipelined loop operations.

BRIEF DESCRIPTION OF THE DRAWINGS

The disclosure may best be understood by reference to the following description taken in conjunction with the accompanying drawings, which illustrate particular example embodiments.

DESCRIPTION OF EXAMPLE EMBODIMENTS

Figure 1:
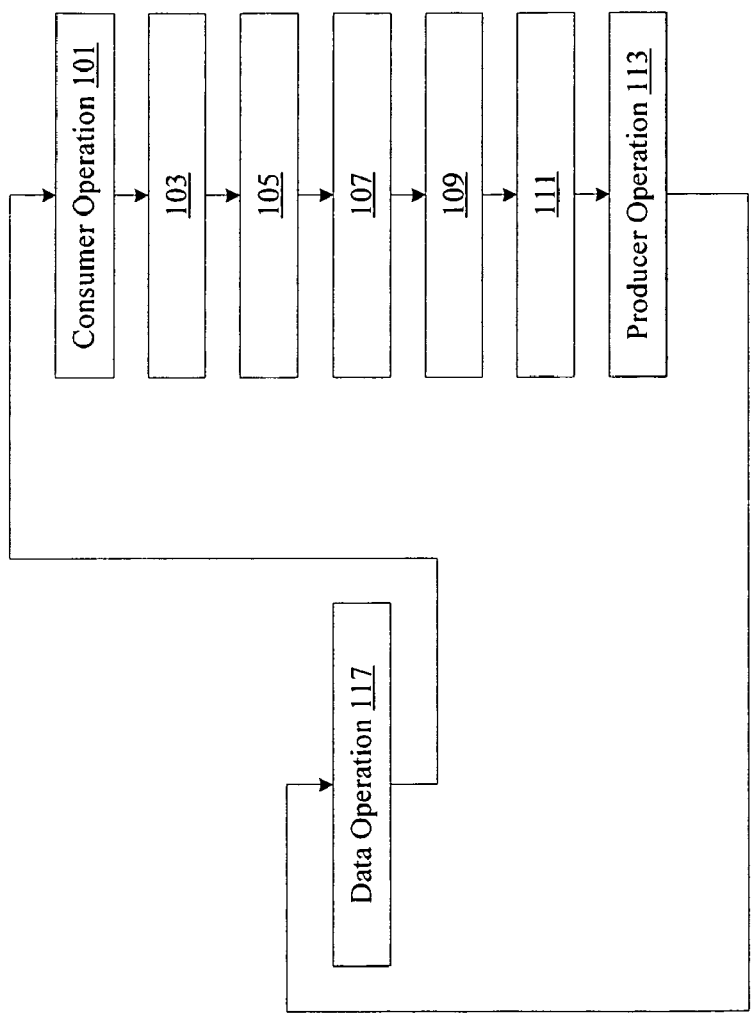
FIG. 1 illustrates a particular example of an operation sequence.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular operations and pipelines. However, it should be noted that the techniques of the present invention apply to a variety of operations and pipelines. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors can while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Pipelined loop operations are efficiently scheduled. A preliminary as soon as possible (ASAP) schedule for a data operation in a pipelined loop is determined. A producer operation clock cycle associated with a producer operation in the pipelined loop is determined. The producer operation provides a data value for use by the data operation in a subsequent loop. A consumer operation clock cycle associated with a consumer operation in the pipelined loop is determined. The consumer operation obtains the data value from the data operation in a previous loop. The data operation is scheduled at the half-way point between the producer operation clock cycle and the consumer operation clock cycle.

Example Embodiments

As Soon As Possible (ASAP), As Late As Possible (ALAP), and List Scheduling algorithms are standard compiler techniques that have been applied to behavioral synthesis. However, ASAP, ALAP, and List Scheduling are not particularly effective when used for scheduling for particular pipelined data paths. Pipelined data paths provide significant efficiency benefits over execution mechanisms that do not use pipelined data paths. Pipelines include a number of stages. Each stage is configured to perform a specific operation in a sequence of operations.Pipelined data paths allow components corresponding to the various stages to be more fully utilized. In ideal pipelined data paths, data can be provided to a pipelined datapath during every clock cycle. However, pipelined data paths are rarely ideal, as a variety of constraints limit their efficiency. Some constraints involve data dependencies.

In a particular example, a loop operation sequence consumes data provided by a previous loop and generates data for consumption by a subsequent loop. The loop includes both a consumer operation and a producer operation. The pipelined loop operation sequence would then have to be configured to wait an appropriate number of clock cycles so that the data needed by consumer operation is available to the consumer and schedule appropriately so that data produced is produced in a timely manner.

ASAP scheduling provides that a data operation is scheduled as soon as possible after the input data becomes available. ALAP scheduling provides that a data operation is scheduled as late as possible before the output data is needed. In many examples, there is a range a clock cycles during which the data operation can be scheduled. The techniques of the present invention recognize that the data operation is sub-optimally scheduled using ASAP or ALAP in a wide variety of pipelined loop operations.

According to various embodiments, the techniques of the present invention recognize that if a loop carried consumer occurs in a loop before a loop carried producer, a data operation is sub-optimally scheduled using either ASAP or ALAP. For example, a loop sequence may include a consumer operation as a first operation. The consumer operation consumes data from a previous loop. The loop sequence may also include a producer operation as the last operation. The producer operation produces data for a subsequent loop. The data operation is dependent on a value from the previous iteration and also outputs a value needed by a subsequent iteration of the loop. It is both a loop-carried producer and a loop-carried consumer and it has both loop-carried producers and loop-carried consumers.

Using ASAP scheduling, the data operation would be scheduled at the earliest time step. The consumer operation would then be able to access data immediately after the earliest time step. The initiation interval based on the loop carried consumer operation is minimized. However, data would not be available to the data operation until the producer operation, which is the last operation in the loop. The initiation interval based on the loop carried producer operation is maximized, as the data operation has to wait until essentially the last time step before the data is available. Consequently, the initiation interval would still be maximized, even though the initiation interval based on the loop carried consumer operation is minimized.

Similarly, using ALAP scheduling, the data operation would be scheduled at the latest time step. The data operation would be able to obtain data from the producer operation immediately. The initiation interval based on the loop carried producer operation is minimized. However, the loop carried consumer would essentially have to wait until the last time step before the data is available. Consequently, the initiation interval would again be maximized, even though the initiation interval based on the loop carried producer operation is minimized.

The techniques of the present invention recognize that efficient solutions for scheduling operations with both a loop carried consumer and a loop carried producer lies somewhere between ASAP and ALAP generated results. According to various embodiments, the techniques of the present invention provide that the data operation is scheduled at a time step that minimizes the maximum of the loop producer based initiation interval and the loop consumer based initiation interval. In particular example embodiments, the middle of the ideal time steps of each path is selected as the time step for the data operation. According to various embodiments, a preliminary initial ASAP schedule is established for all operations in the loop. A list of loop operations is sorted by reverse order of appearance in the source. Operations are iteratively deferred in the loop based on loop-carried dependencies, causing initiation interval constraints to relax as much as possible. The iterative deferral ends when the schedule has settled or when one complete pass over all operations has completed with no deferrals. In particular example embodiments, optimal scheduling of pipelined loop operations is provided.

FIG. 1 illustrates one example of a data flow graph. The data flow graph shows operations and data dependencies. Consumer operation 101 takes an output from data operation 117. Producer operation 113 provides an output to data operation 117. Operations 103, 105, 107, 109, and 111 lie between consumer operation 101 and producer operation 113. It is recognized that conventional scheduling mechanisms produce sub-optimal results when the operation 117 consumes a value that is available at producer operation 113 in a previous iteration, produces a value that is required by a consumer operation 111 in a subsequence iteration, and consumer operation 101 occurs before producer operation 113. According to various embodiments, each operation 101, 103, 105, 107, 109, 111, and 113 occur at different time steps. In particular example embodiments, the time steps are clock cycles.

It should be noted that a data operation as used herein is used to refer to any operation associated with a data dependency. The data operation 117 is dependent on a value from the previous iteration, and also outputs a value that another operation depends on in a following iteration. It is both a loop-carried producer and a loop-carried consumer. It has both loop-carried producers and loop-carried consumers.

Figure 2:
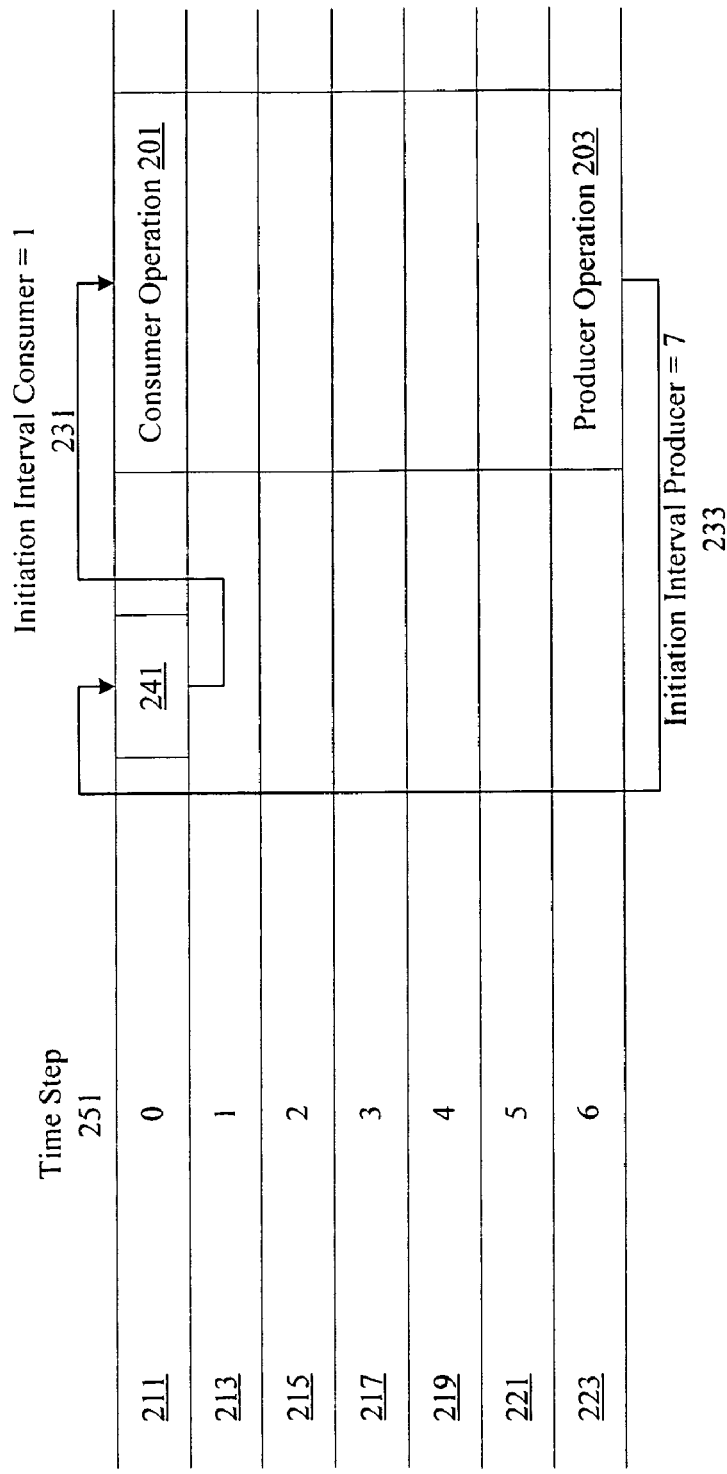
FIG. 2 illustrates a particular example of an operation sequence using as soon as possible (ASAP) scheduling.

FIG. 2 illustrates one example of a data flow graph used with ASAP scheduling. The data flow graph shows time steps 251 including time step 211, 213, 215, 217, 219, 221, and 223. A consumer operation 201 occurs at time step 0 211 and a producer operation 203 occurs at time step 6 223. Other operations may or may not occur at time steps 1 213, 2 215, 3 217, 4 219, and 5 221. The initiation interval 231 or IIC due to the consumer operation 201 is 1, since the consumer operation 201 can take data immediately from data operation 241 which occurs at time step 0. However, the initiation interval 233 or IIP due to the producer operation is 7, since a subsequent loop can not execute until time step 6 223 has passed, since data operation 241 needs data from producer operation 203. The looping path due to the data operation's loop-carried consumer is minimized (IIC=1), but the looping path due to the data operation's loop-carried producer is maximized (IIP=7). Even though IIC is ideal, the loop will have an initiation interval of 7, since the longest loop-carried dependence path determines the initiation interval.

Figure 3:
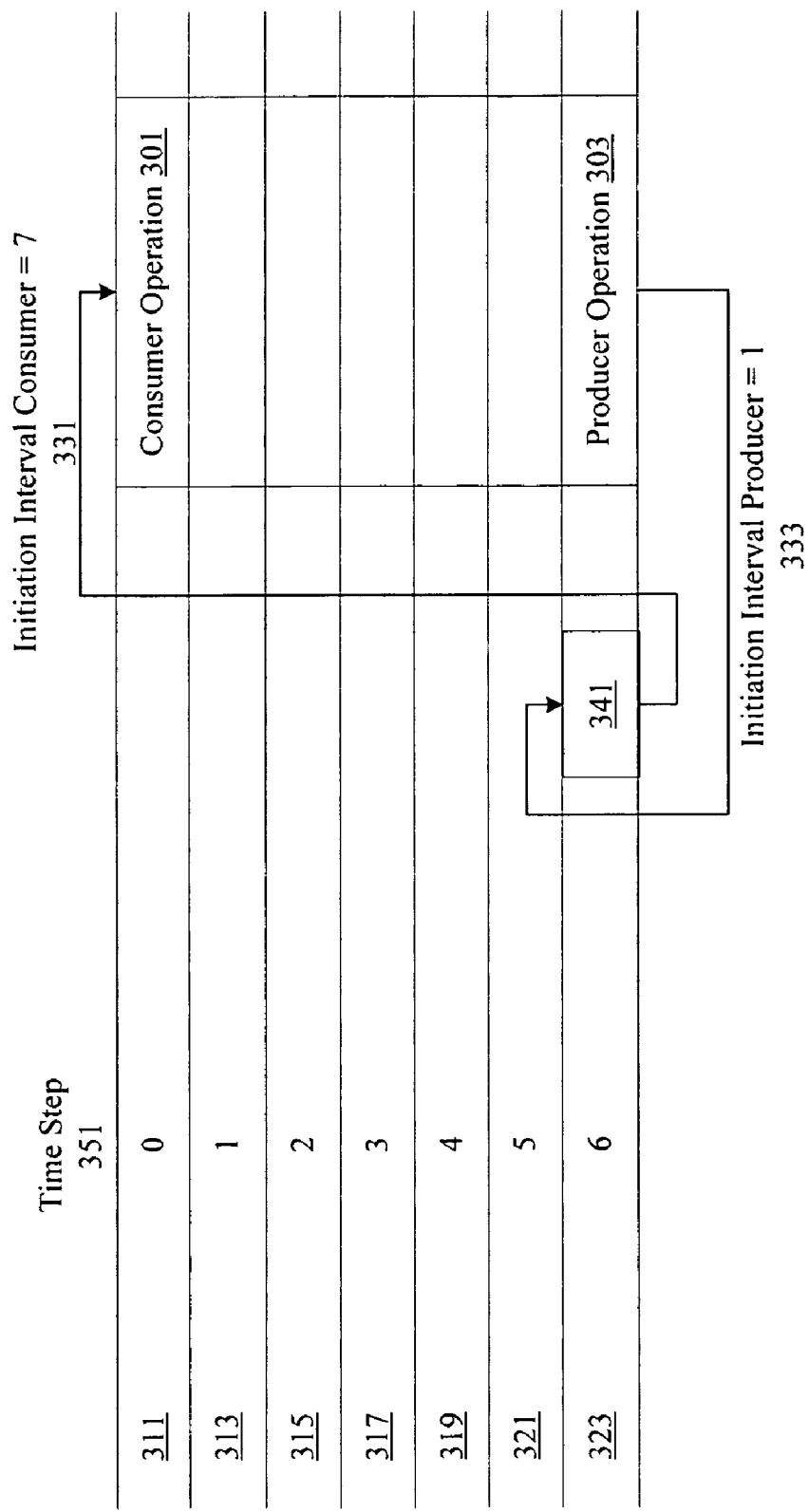
FIG. 3 illustrates a particular example of an operation sequence using as late as possible (ALAP) scheduling.

FIG. 3 illustrates one example of a data flow graph used with ALAP scheduling. The data flow graph shows time steps 351 including time step 311, 313, 315, 317, 319, 321, and 323. A consumer operation 301 occurs at time step 0 311 and a producer operation 303 occurs at time step 6 323. Other operations may or may not occur at time steps 1 313, 2 315, 3 317, 4 319, and 5 321. The initiation interval 331 or IIC due to the consumer operation 301 is 7, since the consumer operation 301 must wait for the operation 341 to process at time step 6. However, the initiation interval 333 or IIP due to the producer operation is 1, since the operation 341 can immediately take the output of producer operation 303 at time step 6. The looping path due to the data operation's loop-carried producer is minimized (IIP=1), but the looping path due to the data operation's loop-carried consumer is maximized (IIC=7). Even though IIP is ideal, the loop will have an initiation interval of 7, since the longest loop-carried dependence path determines the initiation interval.

Figure 4:
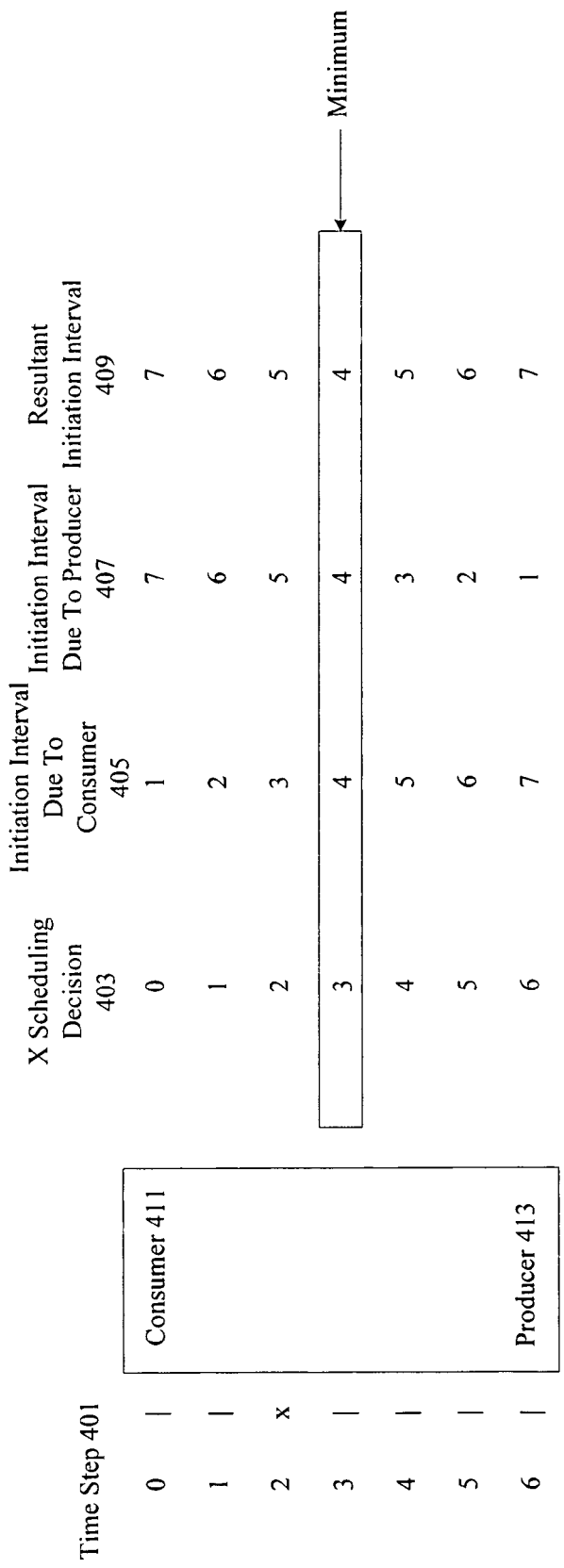
FIG. 4 illustrates a particular example of efficient scheduling for pipelined loop operations.

FIG. 4 illustrates one example of a scheduling mechanism. A consumer operation 411 resides at time step 0. A producer operation 413 resides at time step 6. The scheduling decision column 403 shows various time steps where a data operation associated with consumer 411 and producer 413 can be scheduled. An initiation interval due to consumer (IIC) column 405 shows initiation intervals corresponding to various scheduling decisions for data operation x. An initiation interval due to producer column 407 shows initiation intervals corresponding to various scheduling decisions for data operation x. The resultant initiation interval column 409 shows the actual initiation interval derived from the initiation interval due to the consumer 405 and the initiation interval due to the producer 407.

According to various embodiments, when the data operation x is scheduled at time step 0, the initiation interval due to the consumer operation is 1 and the initiation interval due to the producer operation is 7. The resultant initiation interval is 7. When the data operation x is scheduled at time step 1, the initiation interval due to the consumer operation is 2 and the initiation interval due to the producer operation is 6 The resultant initiation interval is 6. When the data operation x is scheduled at time step 2, the initiation interval due to the consumer operation is 3 and the initiation interval due to the producer operation is 5. The resultant initiation interval is 5.

When the data operation x is scheduled at time step 3, the initiation interval due to the consumer operation is 4 and the initiation interval due to the producer operation is 4. The resultant initiation interval is 4. This is the optimal initiation interval, as it provides the minimum possible initiation interval for the pipelined loop operations. When the data operation x is scheduled at time step 4, the initiation interval due to the consumer operation is 5 and the initiation interval due to the producer operation is 3. The resultant initiation interval is 5. When the data operation x is scheduled at time step 5, the initiation interval due to the consumer operation is 6 and the initiation interval due to the producer operation is 2. The resultant initiation interval is 6. When the data operation x is scheduled at time step 6, the initiation interval due to the consumer operation is 7 and the initiation interval due to the producer operation is 1. The resultant initiation interval is 7.

Figure 5:
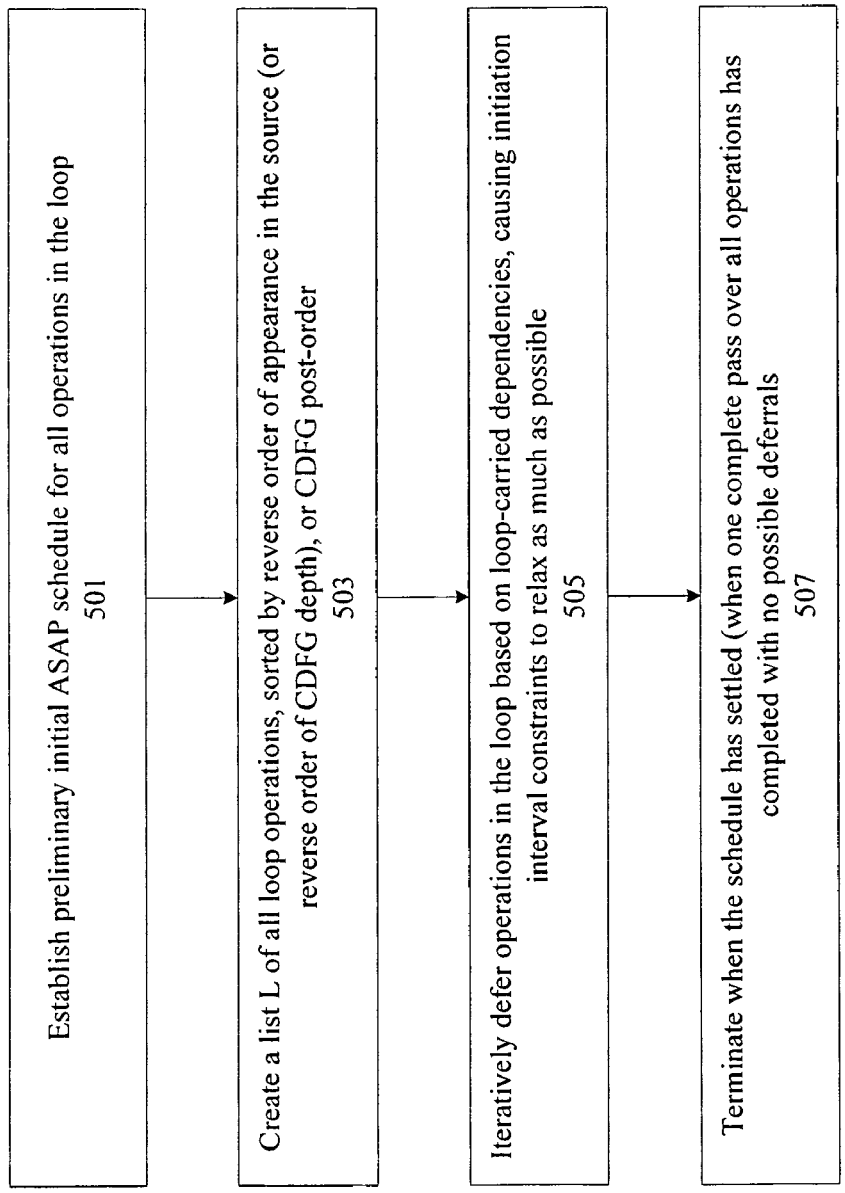
FIG. 5 illustrates a particular example of pipelined scheduling with producer consumer constraints.

FIG. 5 illustrates a technique for scheduling operations in a pipelined loop. At 501, an initial ASAP schedule is generated for all operations in the loop. A loop may include multiple data dependencies, multiple consumer operations, and multiple producer operations. At 503, a list L of all loop operations, sorted by reverse order of appearance in the source is created. In particular example embodiments, the loop operations are sorted in reverse order of data flow graph depth. At 505, operations are iteratively deferred in the loop based on loop-carried dependencies, causing the initiation interval constraints to relax as much as possible. At 507, operations are no longer deferred when the schedule has settled. In particular example embodiments, deferrals are halted when one complete pass over all operations has completed with no possible deferrals. The following code provides one mechanism for scheduling data operations.

```
L = sorted list of loop operations (see above);
bool deferral_performed = TRUE;
while (deferral_performed)
{
  foreach (x in L)
  {
    if (x.has_loop_carried_producers)
    {
      int same_iteration_dependence_clock =
        x.earliest_same_iteration_consumer->input_clock;
      int prev_iteration_producer_clock =
        x.latest_loop_carried_producer->out_clock;
      int ideal_input_clock_for_producer_path =
        prev_iteration_producer_clock - 1;
      int ideal_input_clock_for_consumer_path;
      if (x.has_loop_carried_consumers)
      {
        int next_iteration_consumer_clock =
          x.earliest_loop_carried_consumer->input_clock;
        int ideal_output_clock_for_consumer_path =
          next_iteration_consumer_clock + 1;
        ideal_input_clock_for_consumer_path =
          ideal_output_clock_for_consumer_path - x.latency;
      }
      else
      {
        ideal_input_clock_for_consumer_path
          ideal_input_clock_for_producer_path;
      }
      int ideal_input_clock =
        (ideal_input_clock_for_producer_path -
        ideal_input_clock_for_consumer_path) / 2;
      int ideal_output_clock = ideal_input_clock + x.latency;
      int new_output_clock = MIN(ideal_output,
                                  same_iteration_dependence_clock,
                                  last_allowable_clock);
      int new_input_clock = MAX(x.in_clock,
                                (new_output - x.latency));
      if (new_input > x.in_clock)
      {
        RESCHEDULE_OPERATION(x, new_input_clock);
        deferral_performed = TRUE;
      }
    }
  }
}
```

According to various embodiments, the algorithm terminates because operations are only deferred. That is, operations only move later in the schedule if possible, and cannot extend past the last allowable clock in the initial ASAP schedule. The techniques of the present invention recognize that ASAP scheduling is optimal for each node's consumer paths and sub-optimal for producer paths. ALAP scheduling tends to be optimal for each node's producer paths and sub-optimal for consumer paths. The number of iterations is hence bounded by ($|V|2*|S|$), where $|V|$ is the number of vertices in the DFG, and $|S|$ is the number of time-steps in the ASAP schedule. In a particular example embodiment, operations are initially scheduled in the first time step, and all operations are eventually moved to the last time step, at a rate of one per iteration. Each iteration, $|V|$ nodes are traversed. Each of these $|V|$ nodes are deferred $|S|$ times, at a rate of one per iteration. Therefore, iterative scheduling takes ($|V|*|V|*|S|$) =($|V|2*|S|$).

The iterative scheduling relaxation makes a greedy decision to defer an operation whenever it can. According to various embodiments, this decision is made if the maximum CPLI of all looping paths to/from the current operation can be reduced by deferring the operation and a same-iteration consumer of the current operation's output does not cause the deferral to violate dependence constraints. Deferring improves the producer path at the expense of the consumer path. With the preliminary ASAP schedule, and at every point in the loop, the consumer is scheduled as early as it possibly can. The algorithm uses this information to determine the worst-case consequence of deferring the operation in question X. In a subsequent iteration, this consumer path may be relaxed because of deferral of the consumer operation. In this case, X may be a candidate for deferral again. In the other case of a consumer not being deferred, the greedy decision was still optimal.

In a case where the producer is deferred, since the tree can be visited from bottom-up order, any node will be visited after its producer. Thus the producer would have been scheduled considering X's current time-step as the worst case. This iterative relaxation approach produces optimal results in polynomial time—as shown earlier, the upper bound on the number of iterations is (|V|2*|S|).

The techniques of the present invention can be used with a variety of devices. Nonetheless, one example of an application is being provided for clarity. It should be noted that the techniques of the present invention should not be in any way limited to programmable chips.

Figure 6:
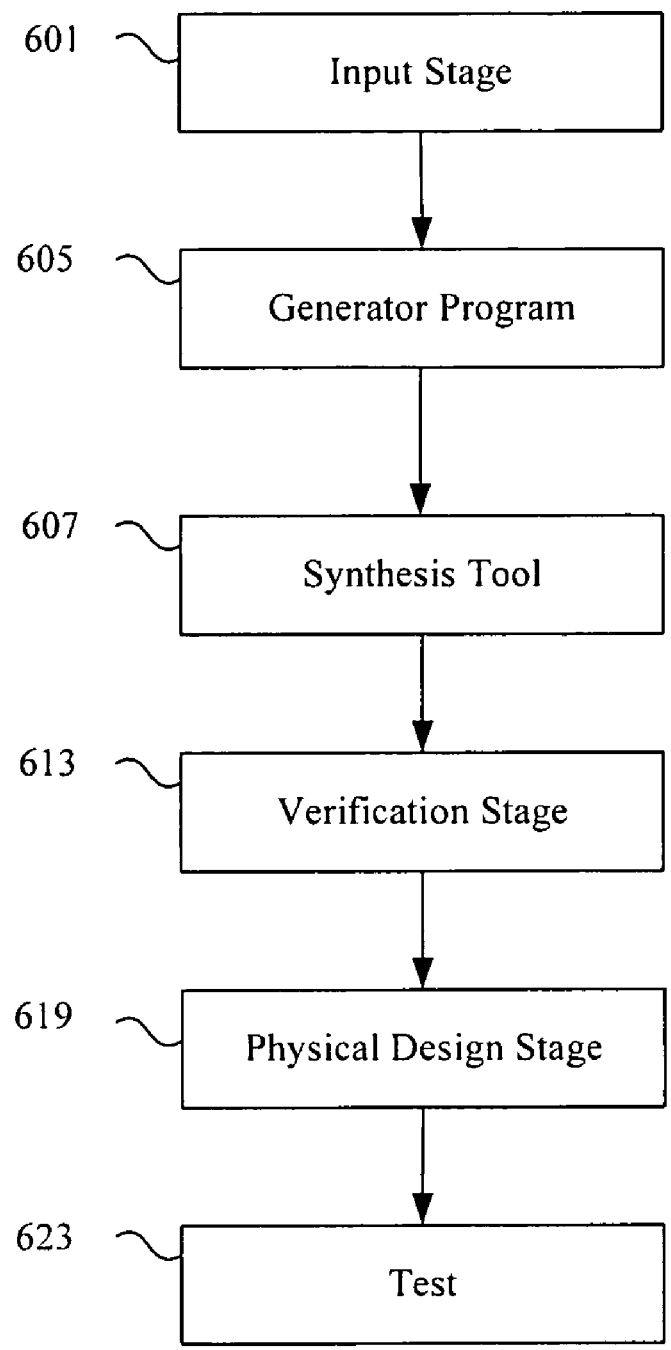
FIG. 6 illustrates a particular example of implementing a programmable device.

FIG. 6 is a diagrammatic representation showing implementation of a programmable chip. According to various embodiments, an input stage 601 receives selection information typically from a user for logic to be implemented on an electronic device. A generator program 605 creates a logic description and provides the logic description along with other customized logic to any of a variety of synthesis tools, place and route programs, and logic configuration tools to allow a logic description to be implemented on an electronic device.

The input stage 601 may be a graphical user interface using wizards for allowing efficient or convenient entry of information. The input stage may also be a text interface or a program reading a data file such as a spreadsheet, database table, or schematic to acquire selection information. The input stage 601 produces an output containing information about the various modules selected.

In typical implementations, the generator program 605 can identify the selections and generate a logic description with information for implementing the various modules. The generator program 605 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 605 identifies pointers and provides ports for each pointer. The generator program 605 also provides information to a synthesis tool 607 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 609.

As will be appreciated by one of skill in the art, the input stage 601, generator program 605, and synthesis tool 607 can be separate programs. The interface between the separate programs can be a database file, a log, or simply messages transmitted between the programs. For example, instead of writing a file to storage, the input stage 601 can send messages directly to the generator program 605 to allow the generator program to create a logic description. Similarly, the generator program can provide information directly to the synthesis tool instead of writing HDL files. Similarly, input stage 601, generator program 605, and synthesis tool 607 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDIF file). An EDIF file is one example of a synthesized netlist file that can be output by the synthesis tool 607.

A synthesis tool 607 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 613 typically follows the synthesis stage 607. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 613, the synthesized netlist file can be provided to physical design tools 619 including place and route and configuration tools. A place and route tool typically locates logic cells on specific logic elements of a target hardware device and connects wires between the inputs and outputs of the various logic elements in accordance with logic required to implement an electronic design. The device can also be physically tested at 623.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 601, the generator program 605, the synthesis tool 607, the verification tools 613, and physical design tools 619 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDIF files are mere examples of a logic description. Other file formats as well as internal program representations are other examples of a logic description.

Figure 7:
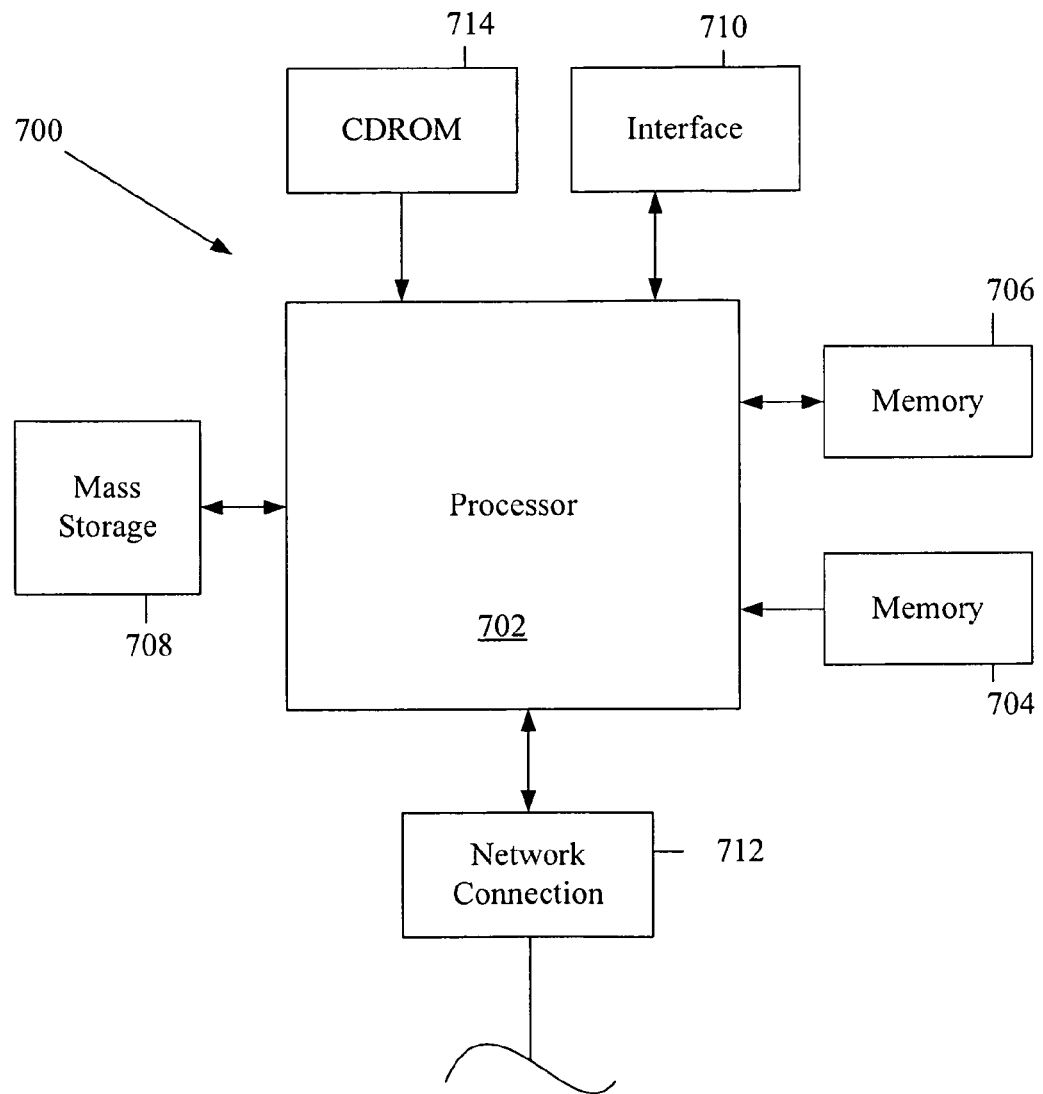
FIG. 7 illustrates a particular example of a programmable device.

FIG. 7 illustrates a typical computer system that can be used to implement a programmable chip having shared I/O lines. The computer system 700 includes any number of processors 702 (also referred to as central processing units, or CPUs) that are coupled to devices including memory 706 (typically a random access memory, or "RAM"), memory 704 (typically a read only memory, or "ROM"). The processors 702 can be configured to generate a test sequences for any designated processor. As is well known in the art, memory 704 acts to transfer data and instructions uni-directionally to the CPU and memory 706 is used typically to transfer data and instructions in a bi-directional manner.

Both of these memory devices may include any suitable type of the computer-readable media described above. A mass storage device 708 is also coupled bi-directionally to CPU 702 and provides additional data storage capacity and may include any of the computer-readable media described above. The mass storage device 708 may be used to store programs, data and the like and is typically a secondary storage medium such as a hard disk that is slower than memory. The mass storage device 708 can be used to hold a library or database of prepackaged logic or intellectual property functions, as well as information on generating particular configurations. It will be appreciated that the information retained within the mass storage device 708, may, in appropriate cases, be incorporated in standard fashion as part of memory 706 as virtual memory. A specific mass storage device such as a CD-ROM 714 may also pass data uni-directionally to the CPU.

CPU 702 is also coupled to an interface 710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. It should be noted that the system 700 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 708 or 714 and executed on CPU 708 in conjunction with primary memory 706.

Although many of the components and processes are described above in the singular for convenience, it will be appreciated by one of skill in the art that multiple components and repeated processes can also be used to practice the techniques of the present invention.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method comprising:
   determining a preliminary as soon as possible (ASAP) schedule for a data operation included in a pipelined loop;
   determining a producer operation clock cycle associated with a producer operation in the pipelined loop, the producer operation providing a data value for use by the data operation in a subsequent loop;
   determining a consumer operation clock cycle associated with a consumer operation in the pipelined loop, the consumer operation obtaining the data value from the data operation in a previous loop; and
   scheduling the data operation included in the pipelined loop at the half-way point between the producer operation clock cycle and the consumer operation clock cycle.

2. The method of claim 1, wherein the producer operation occurs after the consumer operation in a particular loop.

3. The method of claim 1 further comprising iteratively deferring operations in the loop based on loop-carried dependencies.

4. The method of claim 3, wherein initiation constraint intervals are relaxed as much as possible.

5. The method of claim 3, wherein operations are no longer iteratively deferred when the schedule has settled.

6. The method of claim 5, wherein the schedule settles responsive to a complete pass over all operations with no possible deferrals.

7. The method of claim 1, wherein scheduling the data operation at the half-way point between the producer operation clock cycle and the consumer operation clock cycle provides an optimized loop initiation interval.

8. The method of claim 1, wherein the data operation, the consumer operation, and the producer operation are pipelined.

9. The method of claim 1, wherein the data operation, the consumer operation, and the producer operation are implemented on a programmable chip.

10. A system comprising:
    a memory; and
    a processor operable to determine a preliminary as soon as possible (ASAP) schedule for a data operation, wherein the data operation is included in a pipelined loop, to determine a producer operation clock cycle associated with a producer operation in the pipelined loop, the producer operation providing a data value for use by the data operation in a subsequent loop and to determine a consumer operation clock cycle associated with a consumer operation in the pipelined loop, the consumer operation obtaining the data value from the data operation in a previous loop;
    wherein the processor is operable to schedule the data operation included in the pipelined loop at the half-way point between the producer operation clock cycle and the consumer operation clock cycle.

11. The system of claim 10, wherein the producer operation occurs after the consumer operation in a particular loop.

12. The system of claim 10 further comprising iteratively deferring operations in the loop based on loop-carried dependencies.

13. The system of claim 12, wherein initiation constraint intervals are relaxed as much as possible.

14. The system of claim 12, wherein operations are no longer iteratively deferred when the schedule has settled.

15. The system of claim 14, wherein the schedule settles responsive to a complete pass over all operations with no possible deferrals.

16. The system of claim 10, wherein scheduling the data operation at the half-way point between the producer operation clock cycle and the consumer operation clock cycle provides an optimized loop initiation interval.

17. The system of claim 10, wherein the data operation, the consumer operation, and the producer operation are pipelined.

18. The system of claim 10, wherein the data operation, the consumer operation, and the producer operation are implemented on a programmable chip.

19. One or more computer readable media having instructions stored therein for performing a method, the method comprising:

determining a preliminary as soon as possible (ASAP) schedule for a data operation, wherein the data operation is included in a pipelined loop;

determining a producer operation clock cycle associated with a producer operation in the pipelined loop, the producer operation providing a data value for use by the data operation in a subsequent loop;

determining a consumer operation clock cycle associated with a consumer operation in the pipelined loop, the consumer operation obtaining the data value from the data operation in a previous loop; and scheduling the data operation included in the pipelined loop at the half-way point between the producer operation clock cycle and the consumer operation clock cycle.

20. The one or more computer readable media of claim 19, the method further comprising scheduling the producer operation after the consumer operation in a particular loop.

21. The one or more computer readable media of claim 19, the method further comprising iteratively deferring operations in the loop based on loop-carried dependencies.

22. The one or more computer readable media of claim 21, the method further comprising relaxing the initiation constraint intervals as much as possible.

\* \* \* \* \*